(12) United States Patent
Katayama et al.

(10) Patent No.: US 7,364,327 B2
(45) Date of Patent: *Apr. 29, 2008

(54) PROJECTION TYPE DISPLAY UNIT

(75) Inventors: Takeshi Katayama, Yokohama (JP);
Hideharu Saito, Yokohama (JP);
Keiichiro Tokushige, Fujisawa (JP);
Tatsuo Morita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/822,588

(22) Filed: Jul. 9, 2007

(65) Prior Publication Data

US 2007/0258054 A1 Nov. 8, 2007

Related U.S. Application Data

(63) Continuation of application No. 10/802,028, filed on Mar. 17, 2004, now Pat. No. 7,252,416.

(30) Foreign Application Priority Data

Jul. 7, 2003 (JP) ............................. 2003-192564

(51) Int. Cl.
*F21V 29/00* (2006.01)

(52) U.S. Cl. ..................... 362/373; 362/294; 353/58

(58) Field of Classification Search ................ 353/58; 362/294, 373
See application file for complete search history.

(56) References Cited

U.S. PATENT DOCUMENTS 6,540,364 B2 * 4/2003 Takizawa et al. ............. 353/61
6,582,082 B2 6/2003 Tiao et al.
7,252,416 B2 * 8/2007 Katayama et al. .......... 362/373
2002/0015138 A1 2/2002 Ito et al.

FOREIGN PATENT DOCUMENTS

| JP | 10-233983 A | 9/1998 |
| JP | 2000-81673 A | 3/2000 |
| JP | 2002-122839 A | 4/2002 |
| JP | 2002-258248 A | 9/2002 |
| JP | 2002-373524 | 12/2002 |

OTHER PUBLICATIONS

Chinese Office Action, with English Translation, issued in Chinese Patent Application No. 2004100310235, dated on Aug. 3, 2007.

* cited by examiner

*Primary Examiner*—Laura Tso
(74) *Attorney, Agent, or Firm*—McDermott Will & Emery LLP

(57) ABSTRACT

Reduction of noise is achieved by devising an arrangement of heat generating parts such as a light valve element, an electric power source, a light source, etc. and an arrangement of cooling fans. In cooling the light source, the electric power source and liquid crystal panels, a cooling wind path for the liquid crystal panels and the electric power source is made separate from and independent of a cooling wind path for the light source that generates much heat, a cooling air volume is optimized for the respective cooling wind paths, and noise accompanying the rotation of the cooling fans is reduced. Also, by arranging the cooling fans substantially centrally of the respective cooling wind paths, that volume of noise, which leaks from air intake ports and air exhaust port that are opened to a housing of a unit, is reduced.

5 Claims, 9 Drawing Sheets

PROJECTION TYPE DISPLAY UNIT

RELATED APPLICATIONS

This application is a Continuation of U.S. application Ser. No. 10/802,028, filed Mar. 17, 2004, now U.S. Pat. No. 7,252,416 claiming priority of Japanese Application No. 2003-192564, filed Jul. 7, 2003, the entire contents of each of which are hereby incorporated by reference.

BACKGROUND OF THE INVENTION

The present invention relates to a projection type display unit, for example, a liquid crystal projection type display unit, a projection type display device and the like, that projects a reflection on a screen with the use of a light valve such as liquid crystal panels.

Projection type display units include a liquid crystal projection type display unit, a projection type display device and the like in which light from a light source is irradiated on a light valve such as liquid crystal panels, the light valve performs light intensity modulation (also, called spatial light modulation) for transforming into intensity (concentration) of light every pixel, and an optical image is formed, enlarged, and projected onto a screen or the like.

This type of projection type display unit includes therein a plurality of heat generating sources (for example, a lamp of a light source, a light valve, an electric power source for driving the lamp, etc.) and optical parts are shortened in service life due to heat generated from these heat generating sources. Therefore, for example, in the case where the liquid crystal panels are used as a light valve, liquid crystal panels must be kept at temperature of 70° C. or lower. Hereupon, such projection type display unit generally comprises cooling means, by which heat generated from the heat generating sources is exhausted outside the unit.

Conventionally, JP-A-2000-81673 discloses the construction of cooling means for this type of projection type display unit, in which cooling wind paths for cooling a light valve, an electric power source and a light source in the projection type display unit are unified whereby air intake ports and air exhaust ports, respectively, are made in smaller in number than fans used therein to intend to reduce noise leakage outside the projection type display unit from the air intake ports and the air exhaust ports.

Also, JP-A-2002-122839 discloses the construction, in which an intake air by a radial fan is used as a cooling wind in order to cool liquid crystal panels and polarizing plates in a projection type display unit. In this construction, flow of the cooling wind drawn by the radial fan is controlled by guides arranged in a wind path and the cooling wind is concentratedly fed to the liquid crystal panels and the polarizing plates. Since the cooling wind can be efficiently fed to portions that require cooling, a large cooling action can be obtained with low noise.

With the conventional art disclosed in JP-A-2000-81673, however, since cooling wind paths are unified to constitute a single one, heat generating parts, for example, the light valve, the electric power source, the light source, etc. arranged in the cooling wind path from a low-temperature side on sides of the air intake ports to a high-temperature side on sides of the air exhaust ports are restricted in arrangement and it is extremely difficult to have temperatures of respective parts, such as the light valve, the electric power source, the light source, etc. including appropriate margins conformed to the parts. Also, since the light valve, the electric power source and the light source are arranged in the single cooling wind path that is not independent, the electric power source disposed close to the light source is affected by heat of the light source. Further, since the light source is cooled by means of the wind having become hot after cooled the electric power source, a lot of fan air volume is needed to cool the light valve, the electric power source, the light source, etc. and it is difficult to reduce the rotational frequencies of the fans and to reduce noise accompanying the rotation of the fans. Also, since one of the fans is provided close to an air exhaust port opened to a housing, noise generated from the fan is released from the air exhaust port without damping, and so it is difficult to reduce noise.

Also, with the conventional art disclosed in JP-A-2002-122839, an intake air drawn by a radial fan is used to cool the liquid crystal panels and the polarizing plates, and thereafter exhausted from the radial fan passes through a duct as it is and is exhausted from an air exhaust port opened to a housing, and the document does not refer to any use intended for cooling other optical parts. Therefore, the conventional art relates to a technique aiming at low noise and limited to cooling means for a part of elements (for example, liquid crystal panels and polarizing plates) in the projection type display unit, for which cooling is required, and so noise in the entire projection type display unit as well as cooling of other heat generating parts is not necessarily achieved.

SUMMARY OF THE INVENTION

The invention has been thought of in view of these matters, and has its object to provide a projection type display unit, in which noise can be reduced by devising an arrangement of heat generating parts such as a light valve, an electric power source, a light source, etc. and an arrangement of fans.

In order to attain the object, the invention provides a projection type display unit comprising a light source unit, a first cooling fan that cools the light source unit, a light valve that modulates beams of light from the light source unit, a second cooling fan that cools the light valve, and a projection lens for projecting light modulated by the light valve, and wherein a first cooling wind path provided by the first cooling fan and a second cooling wind path provided by the second cooling fan are substantially independent of each other, and the second cooling fan also cools an electric power source of the display unit.

Other objects, features and advantages of the invention will become apparent from the following description of the embodiments of the invention taken in conjunction with the accompanying drawings.

BRIEF DESCRIPTION OF THE DRAWINGS

FIG. 1 is perspective views showing an outward appearance of a projection type display unit according to an embodiment of the invention, in which

DETAILED DESCRIPTION OF PREFERRED EMBODIMENTS

An embodiment of the invention will be described hereinafter with reference to the drawings. In addition, the same characters in all the drawings denote constituent elements having the same functions, and for the sake of avoiding complexity, repetitive descriptions are omitted for those constituent elements, which have been once described.

FIGS. 1 to 6 are views illustrating an embodiment of the invention. An explanation begins with FIG. 1.

Figure 1A:
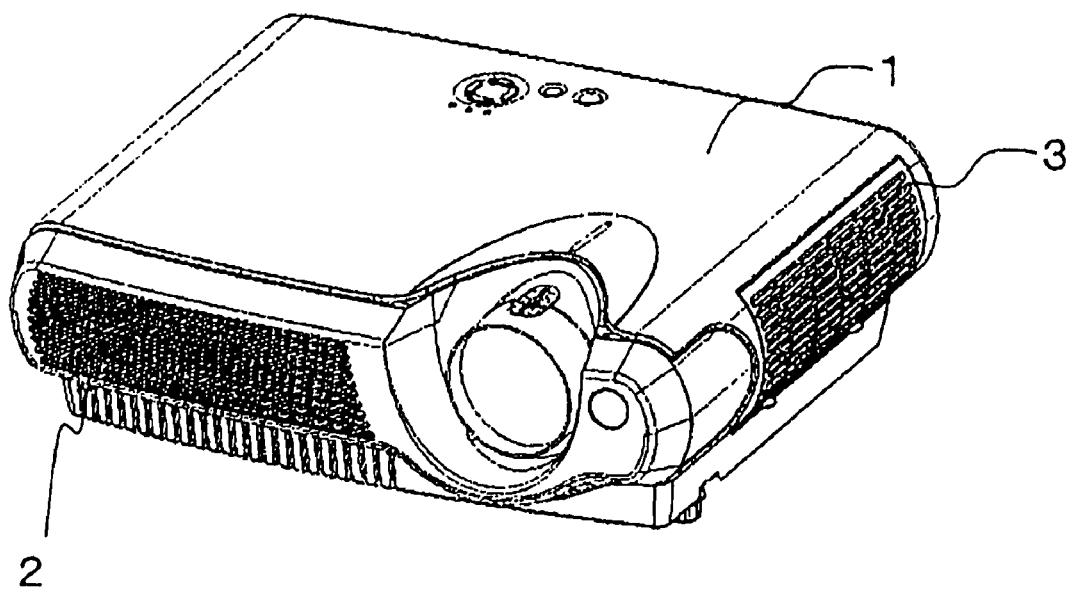
FIG. 1a is a view as viewed from the front and FIG. 1b is a view as viewed from the rear.
Figure 1B:
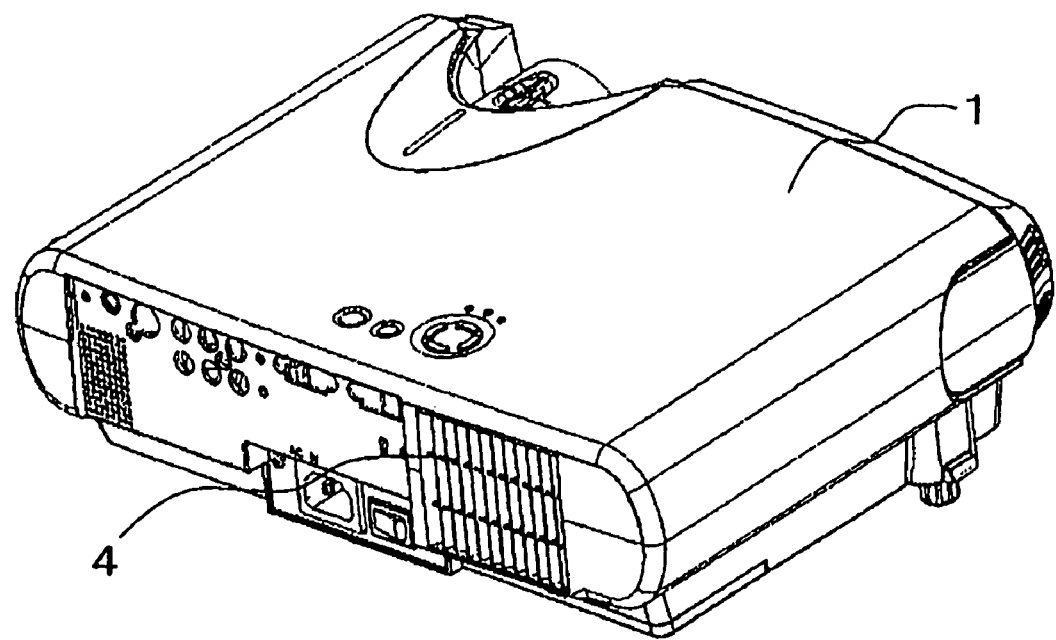

FIG. 1 is perspective views showing an outward appearance of a projection type display unit according to an embodiment of the invention, in which FIG. 1*a* shows a front side of the projection type display unit 1 and FIG. 1*b* shows a rear side of the projection type display unit 1. Description will be given hereinafter with a liquid crystal panel used as a light valve.

In FIG. 1, the projection type display unit 1 according to the invention is provided, as shown in FIG. 1*a*, on a front side thereof with an air exhaust port 2 for an air flow (hereinafter, referred to as wind) having cooled liquid crystal panels (not shown) and an electric power source (not shown) and for wind having cooled a light source (not shown). Also, an air intake port 3 for wind that cools the liquid crystal panels (not shown) is provided on a side of the unit. Further, an air intake port 4 for wind that cools a light source (not shown) is provided on the rear side of the unit as shown in FIG. 1*b*.

Figure 2:
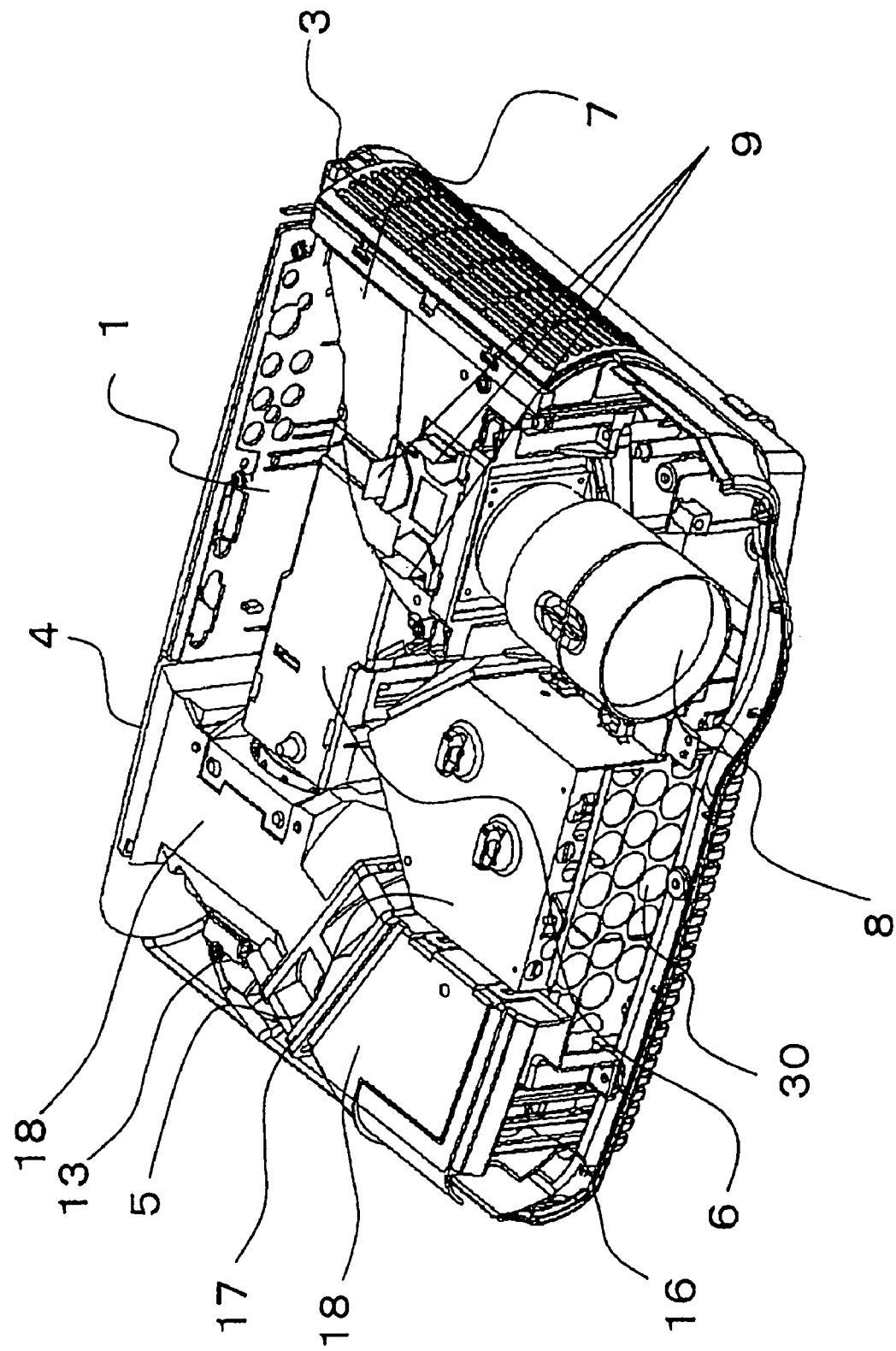
FIG. 2 is a perspective view showing an internal construction of the projection type display unit according to the embodiment of the invention.

FIG. 2 is a perspective view showing an internal construction of the projection type display unit 1, according to the embodiment of the invention, shown in FIGS. 1*a* and 1*b*.

In FIG. 2, a sirocco fan (not shown) that cools the liquid crystal panels 9 and the electric power source 5 is provided below an optical engine 6 with an air intake port thereof directed upward, and the liquid crystal panels 9 provided within the optical engine 6 and the air intake port for the sirocco fan (not shown) are connected to each other by means of a duct (not shown, and details thereof will be described later). Also, the liquid crystal panels 9 are communicated to an outside air through an air intake duct 7. An air exhaust port of the sirocco fan (not shown) is directed toward the electric power source 5, and the electric power source 5 and the air exhaust port of the sirocco fan (not shown) is communicated to each other through a duct (not shown, and details thereof will be described later). And, an air drawn through the air intake duct 7 defines a wind path that is a flow passage of an air flow via the air intake duct 7—the liquid crystal panels 9—the sirocco fan—the electric power source 5, and cools the liquid crystal panels 9 and the electric power source 5. A cooling wind having cooled the electric power source 5 passes through an air exhaust port 30 disposed on a front surface of the unit 1 and is exhausted into the outside air via the air exhaust port 2 that is opened to a front surface of a housing of the unit 1.

A lamp 13 serving as a light source and an axial fan 17 are arranged in this order from the air intake port 4 in a cooling wind path covered by a duct 18 that leads to an air exhaust port 16 on the front surface of the unit 1 from the air intake port 4 on the back surface of the unit. And, an air drawn from the air intake port 4 cools the lamp 13, passes through the air exhaust port 16 via the axial fan 17, and is exhausted into the outside air from the air exhaust port 2 in front of the air exhaust port 16.

In this manner, according to the invention, the cooling wind path for the light source and the cooling wind path for the liquid crystal panels and the electric power source are separated from each other.

The projection type display unit 1 roughly operates in such a manner that after light generated from the light source 5 is modulated by the liquid crystal panels 9 provided in the optical engine 6, it is projected through a projection lens 8 that constitutes projection means, onto a screen (not shown), etc. outside the device to display a reflection.

In addition, the optical engine 6 comprises an illumination optical system (not shown), by which light from the light source 5 being illumination means is irradiated on the liquid crystal panels 9, the liquid crystal panels 9 that performs light intensity modulation, in which light irradiated by the illumination optical system is transformed into concentration of light every pixel according to a picture signal, to form an optical image, and the projection lens 8 that constitutes projection means for, enlarging and projecting the optical image. In FIG. 2, the optical engine 6 uses three liquid crystal panels 9 as a light valve.

Figure 3:
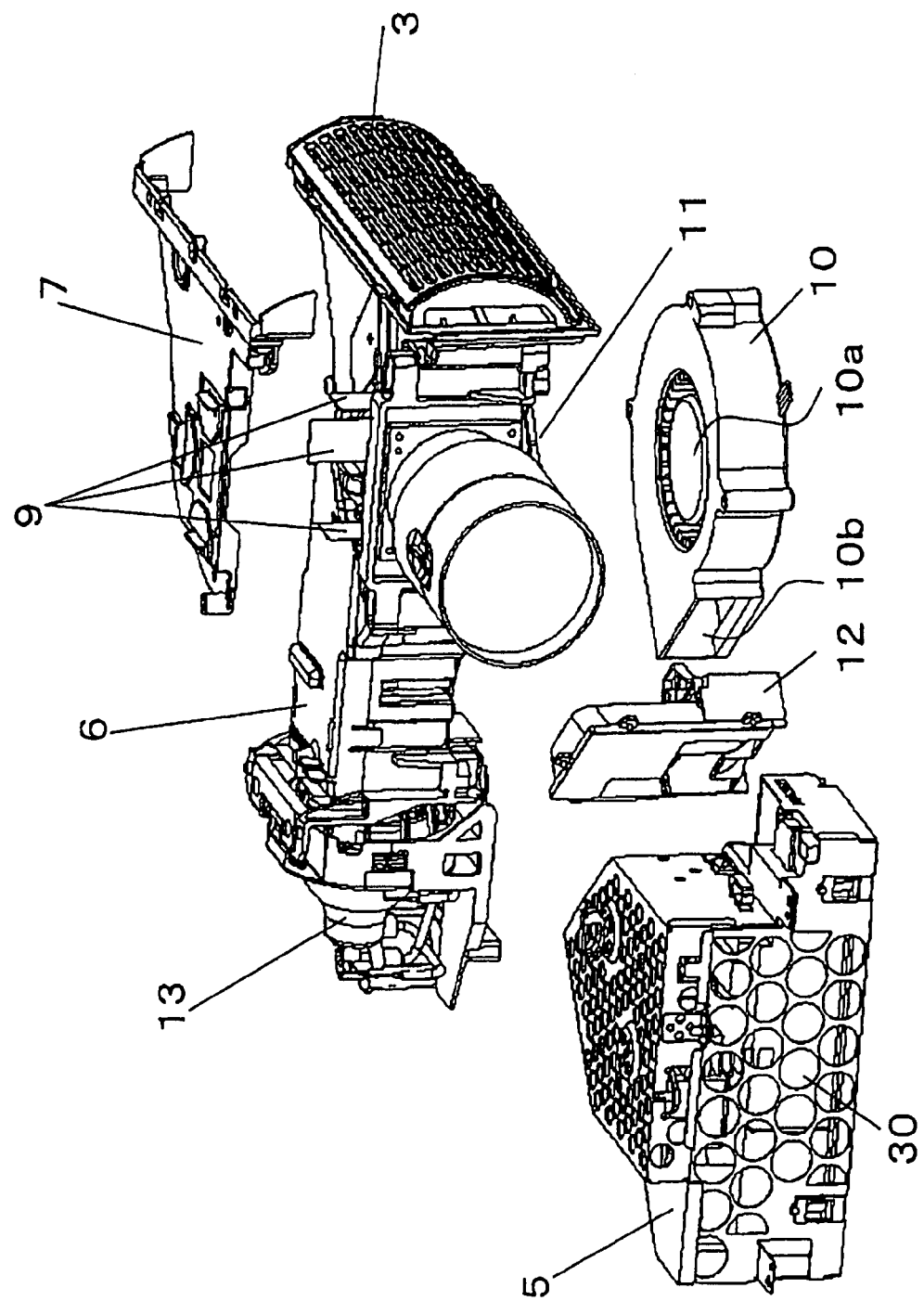
FIG. 3 is an exploded view showing a detailed, construction of cooling wind path portions for cooling liquid crystal panels and an electric power source.

FIG. 3 is an exploded view showing a detailed construction of cooling wind path portions that constitute a cooling air passage extending from the air intake port 3 for cooling the liquid crystal panels 9 and the electric power source 5 to the air exhaust port 30, in the projection type display unit 1, according to, the embodiment of the invention, shown in FIG. 2.

In FIG. 3, the sirocco fan 10 is arranged below the liquid crystal panels 9 built in the optical engine 6 with an air intake port 10*a* thereof directed toward the liquid crystal panels 9. Arranged between the sirocco fan 10 and the optical engine 6 is an air intake duct 11 that guides wind having cooled the liquid crystal panels 9 to the sirocco fan 10. Arranged above the optical engine 6 is an air intake duct 7 that guides wind for cooling the liquid crystal panels 9. The air intake duct 7 is connected to outside from a side of the projection type display unit 1 and serves to guide an air outside the projection type display unit 1 to the liquid crystal panels 9 built in the optical engine 6.

The electric power source 5 is arranged on the lee of wind that leaves an air exhaust port 10*b* of the sirocco fan 10. Arranged between the sirocco fan 10 and the electric power source 5 is an air exhaust duct 12, through which wind exhausted from the air exhaust port 10*b* of the sirocco fan 10 is guided toward the electric power source 5. Wind exhausted from the air exhaust port 10*b* of the sirocco fan 10 passes through the air exhaust duct 12 to cool the electric power source 5. Wind having cooled the electric power source 5 passes through the air exhaust port 30 disposed on the front surface of the projection type display unit 1 and provided on the lee of the electric power source 5, and is exhausted outside the projection type display unit 1 from the air exhaust port 2.

A cooling wind path that constitutes a cooling air passage leading to the air exhaust port 30 provided on the side of the projection type display unit 1 from the air intake port 3 provided on the side of the projection type display unit 1 via the air intake duct 7, the liquid crystal panels 9 built in the optical engine 6, the air intake duct 11, the sirocco fan 10, the air exhaust duct 12, and the electric power source 5 shown in FIG. 3 is separated from a cooling wind path (described later) provided to cool the lamp 13 that constitutes a light source.

Figure 4:
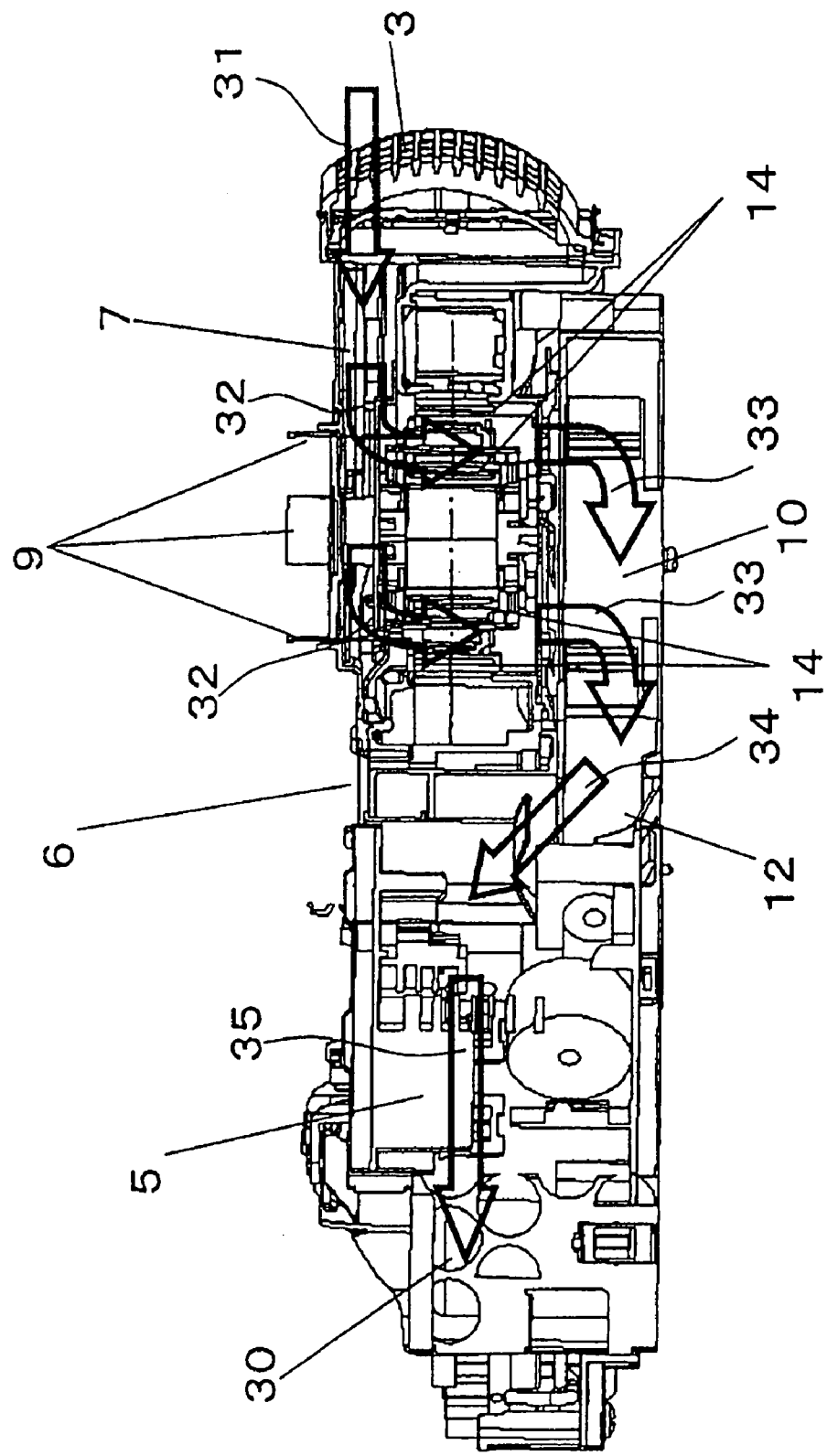
FIG. 4 is a cross sectional view showing the operating state of the cooling wind path portions for cooling the liquid crystal panels and the electric power source.
Figure 5:
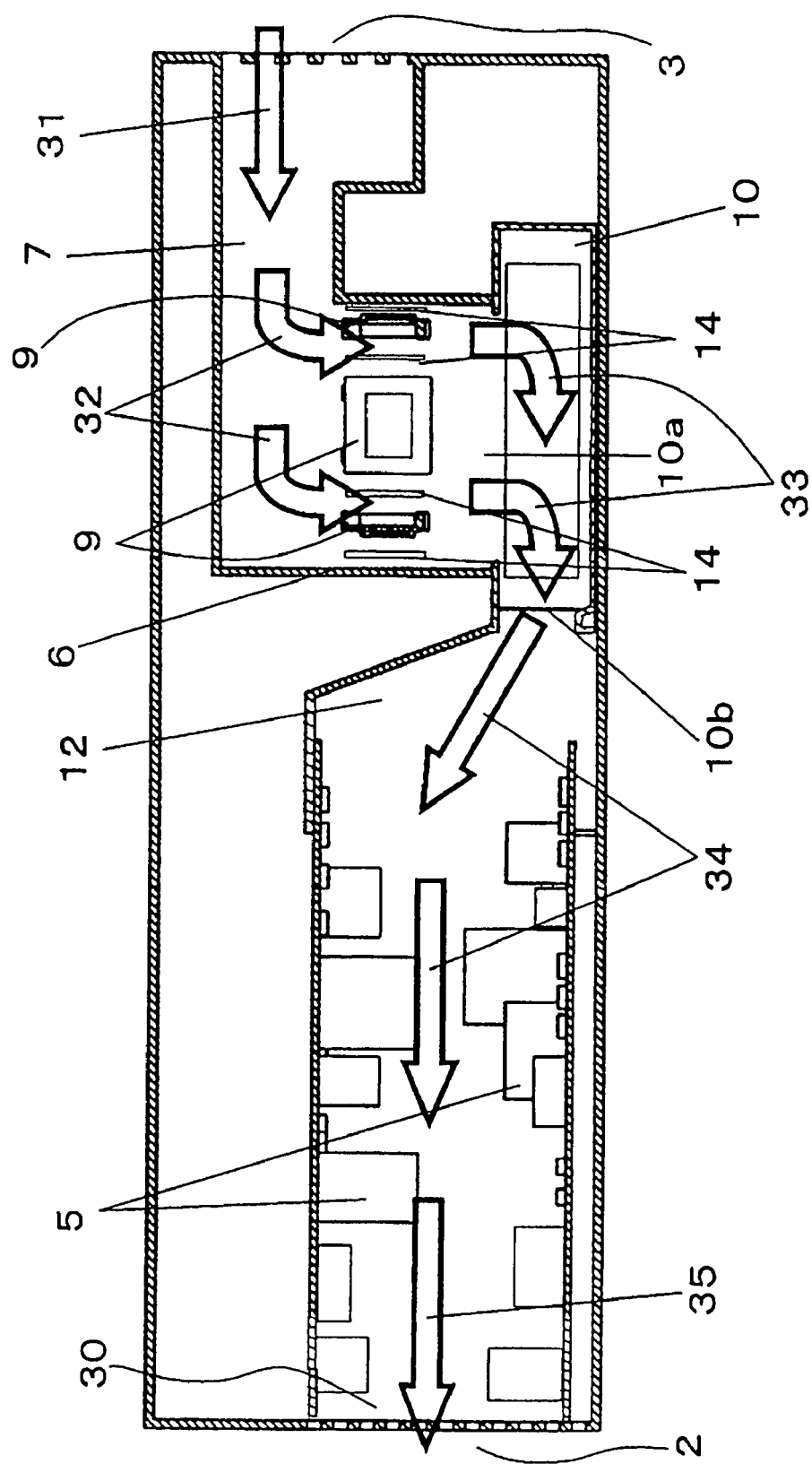
FIG. 5 is a schematic view corresponding to FIG. 4.

FIG. 4 is a cross sectional view showing a state of the cooling operation of the liquid crystal panels 9 and the electric power source 5 in the projection type display unit 1, according to the embodiment of the invention, shown in FIG. 3, and FIG. 5 is a schematic view showing the state of the cooling operation.

In FIGS. 4 and 5, the sirocco fan 10 draws an outside air from the air intake port 3 provided on the side of the projection type display unit 1 as indicated, by an arrow 31. The drawn air makes wind, which passes through the air intake duct 7 and through a space that receives therein the liquid crystal panels 9 in the optical engine 6, as indicated by arrows 32. When passing through the space, the wind takes heat generated by the liquid crystal panels 9 from surfaces of the liquid crystal panels 9 to cool the liquid crystal panels 9. Also, the wind likewise cools polarizing plates 14 arranged before and behind the liquid crystal panels 9 on an optical path of light incident upon the liquid crystal panels 9. For the convenience of explanation, the liquid crystal panels and the polarizing plates are hereinafter referred to as the liquid crystal panels 9, etc. The wind having cooled the liquid crystal panels 9, etc. is drawn into the air intake port 10a of the sirocco fan 10 as indicated by an arrow 33. The wind as drawn passes through an interior of the sirocco fan 10 and is then exhausted from the air exhaust port 10b of the sirocco fan 10. The wind as exhausted becomes higher in temperature than the outside air since it has taken heat generated by the liquid crystal panels 9, etc. and has been heated to an internal temperature of the projection type display unit 1. The wind as exhausted passes through the air exhaust duct 12 as indicated by an arrow 34 and is blown against the electric power source 5. The wind as blown takes heat generated by respective parts of the electric power source 5 to cool the electric power source 5. The wind having cooled the electric power source 5 passes through the air exhaust port 30 provided on the lee of the electric power source 5 and is exhausted outside the projection type display unit 1 via the air exhaust port 2 as indicated by an arrow 35.

In order to cool the liquid crystal panels 9, etc., a cooling effect as produced is great when wind passing over the surfaces of the liquid crystal panels 9, etc. is low in temperature and high in wind velocity. Heat generated from the liquid crystal panels 9, etc. of the projection type display unit 1 including liquid crystal projectors has increased steadily with an increase in luminance. Also, since the liquid crystal panels 9, etc. are made further small in size, a calorific value per unit area is further increased and so a corresponding air volume (low temperature and large wind velocity) is required. Among heat generating parts in the projection type display unit 1, a maximum cooling effect is required by, for example, the liquid crystal panels 9, etc. having an allowable temperature of 70° C. or lower.

In order to cool the electric power source 5, the cooling effect is great when wind passing over surfaces of parts of the electric power source is low in temperature and high in wind velocity. However, as compared with the liquid crystal panels 9, etc., an air volume that produces so much cooling effect is not required. Actually, the parts of the electric power source have an allowable temperature of appropriately 100° C. in strict cases.

In this manner, the construction shown in FIGS. 4 and 5 is provided in order to optimize an air volume and restrict noise to a low level by using a single cooling wind path to perform cooling of the liquid crystal panels 9, etc. that require a large cooling effect, and cooling of the electric power source 5 that does not require so much cooling effect.

More specifically, in order to use wind of temperature as low as possible as a cooling wind, an outside air is directly taken in for the liquid crystal panels 9, etc. Also, the liquid crystal panels 9, etc. are arranged in a position (a position close to the air intake port 3 on the air intake side from the sirocco fan 10), in which the liquid crystal panels 9, etc. can be cooled before the outside air is heated by the internal temperature of the projection type display unit 1. Since cooling of the electric power source 5 is possible even when the wind having been warmed after cooling of the liquid crystal panels 9, etc. is used, the electric power source 5 is arranged in a position (a position close to the air exhaust port 2 on the air exhaust side from the sirocco fan 10), in which cooling, is enabled by the air exhaust of the sirocco fan 10. And, in order to restrict noise to a low level, a single sirocco fan 10 that can supply an appropriate air volume and constitutes a source of noise release is arranged midway the wind path leading to the electric power source 5 from the liquid crystal panels 9, etc. as shown in FIGS. 4 and 5. Since the position, in which the sirocco fan 10 constituting a source of noise release is arranged, is adequately distant from the air, intake port 3 and the air exhaust port 30 that are opened outside the projection type display unit 1, and obstacles such ducts or the like are present between the position and the ports, noise of the sirocco fan 10 is hard to be transmitted outside the projection type display unit 1.

Generally, restriction of noise to a low level is greatly dependent upon how small and optimum the air volume of the fan can be made. According to the invention, in cooling of the light source, the electric power source and the liquid crystal panels, etc., cooling of the liquid crystal panels 9, etc. and the electric power source 5 is made separate from and independent of cooling (details being described later) of the light source that generates much heat, not to thereby be affected by heat from the light source, and cooling of the liquid crystal panels 9, etc. and the electric power source 5 is performed such that a cooling air volume for the liquid crystal panels 9, etc. that requires a larger cooling effect than that for the electric power source is optimized and after the liquid crystal panels 9, etc. are cooled, the electric power source 5 that does not require as much as the cooling effect for the liquid crystal panels 9, etc. is also cooled. Therefore, since the liquid crystal panels 9, etc. and the electric power source 5 are not affected by the light source and it is not necessary to optimize cooling of the liquid crystal panels 9, etc. and cooling of the electric power source 5, respectively, it suffices that only a cooling air volume for the liquid crystal panels 9, etc. be optimized, and it is possible to restrict noise to a low level and to relatively easily realize achievement of low noise.

Figure 6:
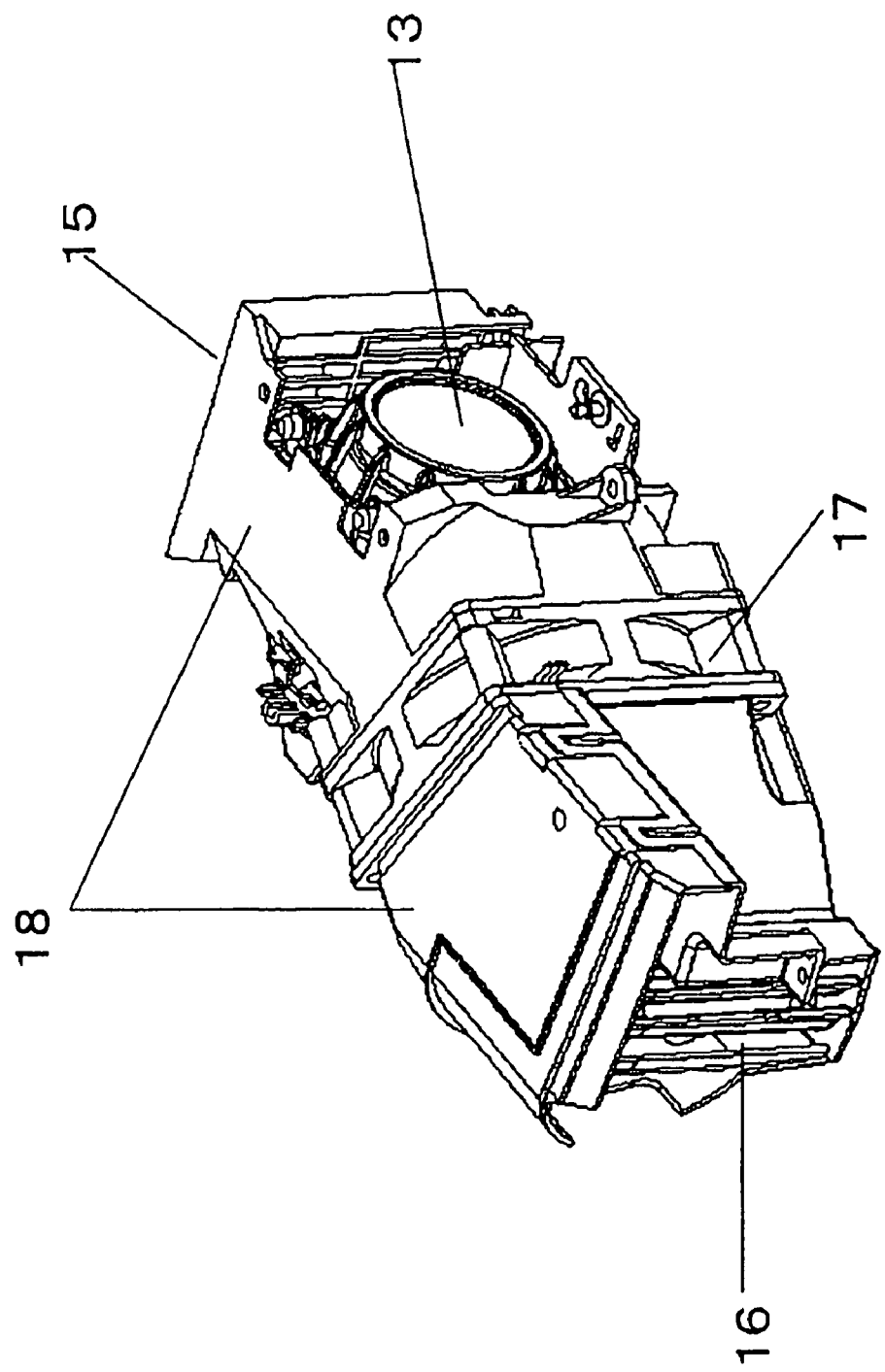
FIG. 6 is a view showing a construction for cooling wind path portions for cooling a lamp.

FIG. 6 shows a construction of a cooling wind path portion that leads to the air exhaust port 16 from an air intake port 15 for cooling the lamp 13, in the projection type display unit 1, according to the embodiment of the invention, shown in FIG. 2.

In FIG. 6, the wind path for cooling the lamp 13 is configured such that the axial fan 17 is used to take in an outside air from the air intake port 15 inside the air intake port 4 disposed on the back surface of the projection type display unit 1 and after cooling the lamp 13, the outside air passes through the air exhaust port 16 disposed on the front surface of the projection type display unit 1 to be exhausted from the air exhaust port 2 opened to the front surface of the housing of the unit 1. The cooling wind path is covered by the duct 18 and independent of the cooling wind path for the liquid crystal panels 9, etc. and the electric power source 5. The lamp 13 and the axial fan 17 are arranged in this order from a side of the air intake port 15 within the duct 18, and wind taken in from the air intake port 15 takes away heat generated by the lamp 13 to cool the lamp 13.

The cooling wind path including the lamp 13 is covered by the duct 18 whereby heat of the lamp 13 is cut off from outside the duct 18 and so the liquid crystal panels 9, etc. and the electric power source 5 are prevented from being raised in temperature. Thereby, it becomes easy to optimize a cooling air volume for cooling the liquid crystal panels 9, etc. and cooling the electric power source 5. Also, it becomes easy to optimize a cooling air volume for cooling the lamp.

As described above, according to the invention, cooling the light source, the electric power source and the liquid crystal panels, etc. is performed such that the cooling wind path for the liquid crystal panels 9, etc. and the electric power source 5 is made separate from and independent of the cooling wind path for the light source that generates much heat, and so excluded from influences of heat from the light source, a cooling air volume is optimized for the respective cooling wind paths, and the cooling fans are decreased in rotational frequency to reduce noise accompanying the rotation of the cooling fans. Also, by arranging the cooling fans 10, 17 substantially centrally of the respective cooling wind paths, that volume of noise, which is generated from the cooling fans and leaks from the air intake ports and the air exhaust port that are opened to the housing of the unit, is reduced, and so noise is reduced.

The cooling wind having cooled the liquid crystal panels 9, etc. to be increased in temperature (fairly lower than the allowable temperature 70° C. of the liquid crystal panels) has still a temperature enough low to cool the electric power source 5. Accordingly, while being not mentioned with reference to FIG. 4, the cooling wind may be used to cool a polarization conversion element (having the allowable temperature of approximately 80° C.) commonly used in an illumination optical system, by which light from the light source is irradiated on the liquid crystal panels 9. Cooling the polarization conversion element will be described hereinafter with reference to FIGS. 7 and 8.

Figure 7:
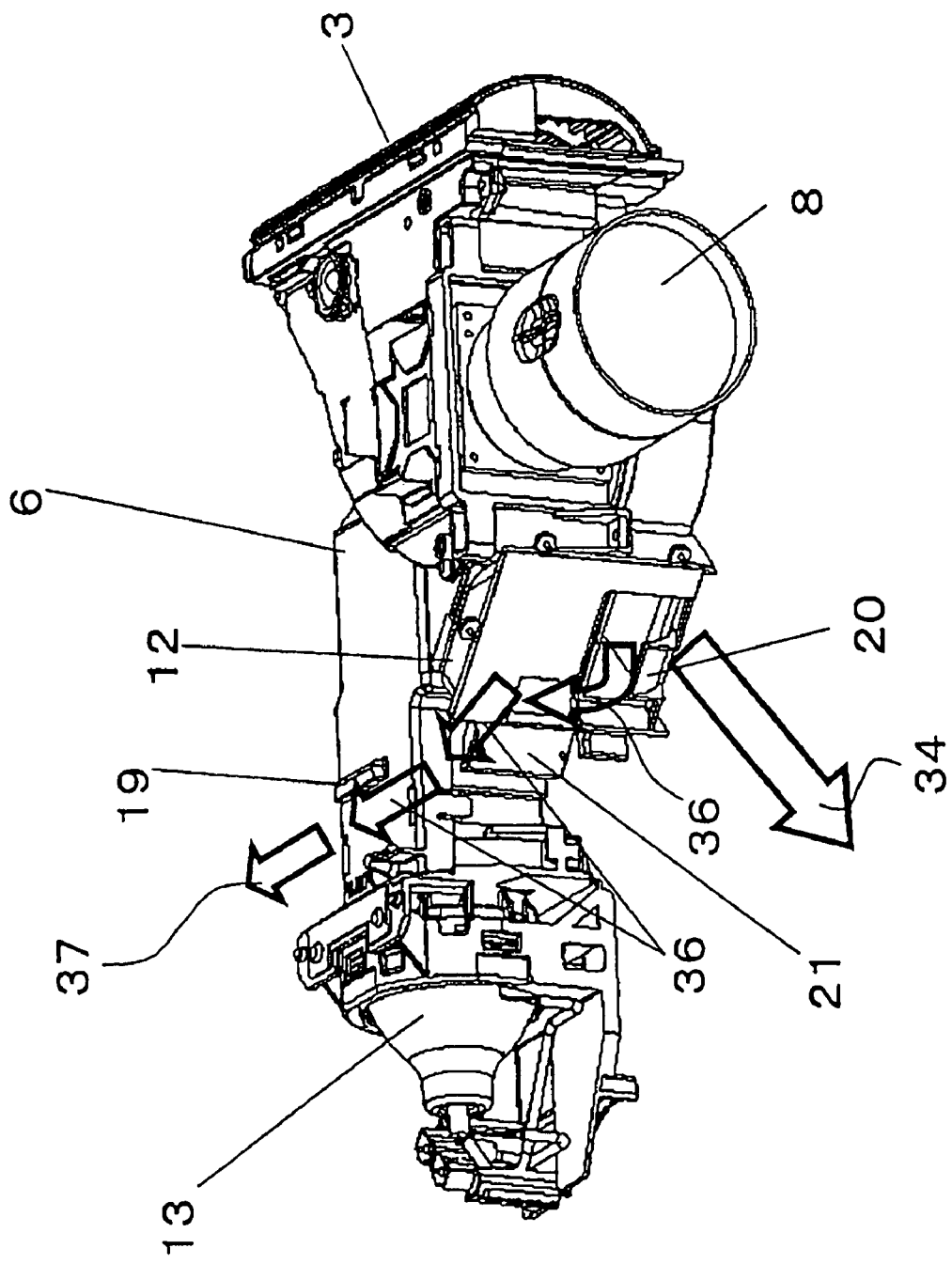
FIG. 7 is a perspective view showing a construction of cooling wind path portions for a polarization conversion element.
Figure 8:
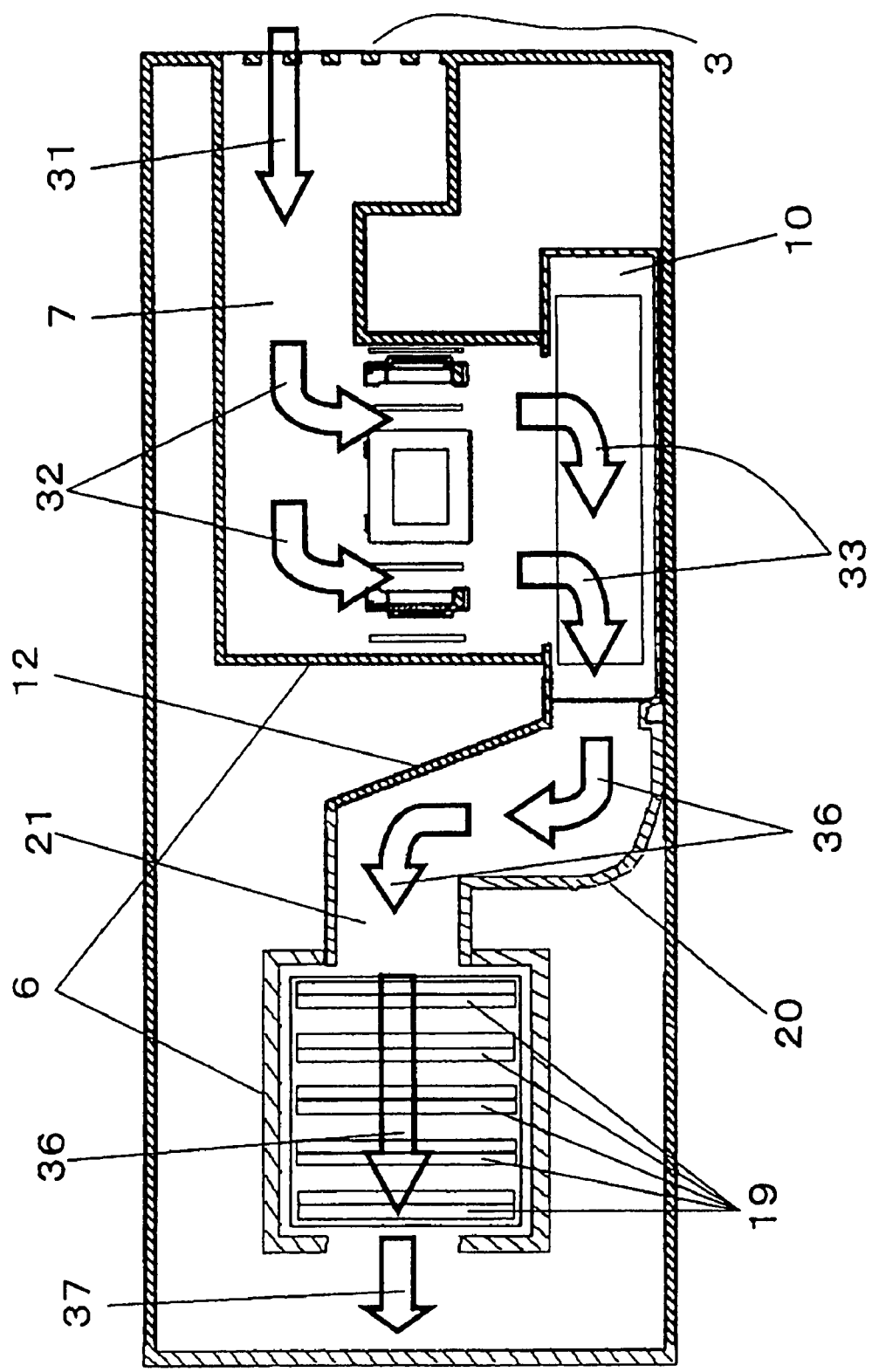
FIG. 8 is a schematic view showing a cross section in FIG. 7.

FIG. 7 is a perspective view showing a construction of a cooling wind path portion leading to a polarization conversion element 19 arranged in the optical engine 6 from the air exhaust duct 12 in the projection type display unit 1, according to the embodiment of the invention, shown in FIG. 3 in the case where wind exhausted from the air exhaust duct 12 is used for cooling the electric power source 5 and divided and used for cooling the polarization conversion element 19, and FIG. 8 is a schematic view showing a cross section of the construction.

In FIGS. 7 and 8, wind exhausted from the air exhaust port 10b of the sirocco fan 10 passes through the air exhaust duct 12 and is blown against the electric power source 5 as indicated by an arrow 34. By adding to the air exhaust duct 12 a baffle 20 and a duct 21 connected to the polarization conversion element 19, a part of the wind directed toward the electric power source 5 is divided and can be used for cooling the polarization conversion element 19. The wind blown against the polarization conversion element 19 as indicated by an arrow 36 takes away heat generated by the polarization conversion element 19 to cool the polarization conversion element 19. The wind having cooled the polarization conversion element 19 arranged in the optical engine 6 is exhausted, as indicated by an arrow 37, outside the optical engine 6 from an air exhaust port (not shown) of the optical engine 6 arranged on the lee of the polarization conversion element 19.

Figure 9:
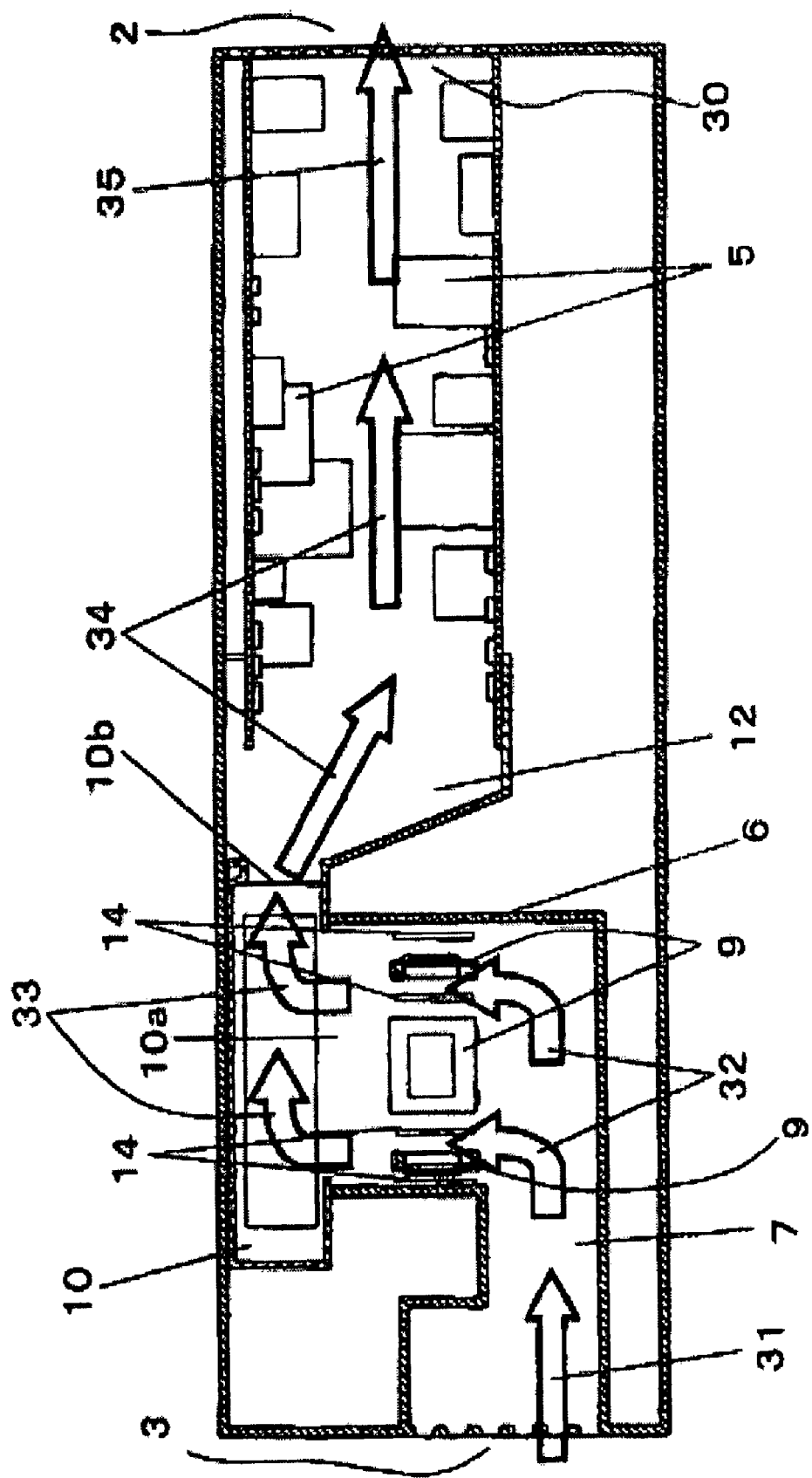
FIG. 9 is a schematic view showing a cross section of a variation of the display unit of FIGS. 3-8.

A variation of the display unit is exemplified in the cross-sectional view shown schematically in FIG. 9. In FIG. 9, the sirocco fan 10 is arranged with air intake port 10a thereof above the liquid crystal panels 9 built in the optical engine 6. Arranged below the liquid crystal panels 9, an air intake duct 7 guides wind, drawn by fan 10, for cooling the liquid crystal panels 9. The air intake duct 7 is connected to outside from a side of the projection type display unit 1 and serves to guide an air outside the projection type display unit 1 to the liquid crystal panels 9 built in the optical engine 6.

In this manner, the invention can also achieve low noise when the wind exhausted from the air exhaust duct 12 is used for cooling not only the electric power source 5 but also the electric power source 5 and the polarization conversion element 19.

As described above, according to the invention, respective independent cooling wind paths are defined for the liquid crystal panels 9, etc. and the lamp 13, for both of which a large cooling effect is demanded, and small air volumes optimized for the respective wind paths make it possible to realize cooling of heat generating parts of the projection type display unit 1. Thereby, low noise is achieved. Also, since the number of fans is as small as two, it is possible to realize low cost, miniaturization, and reduction in weight.

As described above, it is possible in the invention to realize low noise in projection type display units.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A projection type display unit comprising:
an electric power source;
a light source unit;
a polarization conversion element for collecting polarization directions of light beams from the light source unit;
a light valve that modulates the light beams from the polarization conversion element;
a sirocco fan arranged above or below the light valve and comprising an air intake port and an air exhaust port;
a projection lens for projecting light modulated by the light valve;
a housing including at least air intake port and an exhaust port;
a first wind path formed at a first region including the light source unit;
a second wind path formed at a second region different from the first region and including at least the light valve and the electric power source unit; and
a duct arranged in the second wind path adjacent the air exhaust port of the sirocco fan and for dividing air from the air exhaust port of the sirocco fan into at least a first direction and a second direction.

2. The projection type display unit according to claim 1, wherein air divided to the first direction passes through the electric power source and air divided to the second direction passes through polarization conversion element.

3. The projection type display unit according to claim 2, wherein the air intake port and the air exhaust port of the housing are provided on side surfaces of the housing.

4. A projection type display unit comprising:
an electric power source;
a light source unit;
an axial fan that cools the light source unit;
a polarization conversion element for collecting polarization directions of light beams from the light source unit;
a light valve that modulates the light beams from the polarization conversion element;
a sirocco fan arranged above or below the light valve and comprising an air intake port and an air exhaust port;
a projection lens for projecting light modulated by the light valve;
a housing including at least air intake port and an exhaust port;
a first wind path formed at a first region including the light source unit;
a second wind path formed at a second region different from the first region and including at least the light valve and the electric power source unit; and
a duct arranged in the second wind path adjacent the air exhaust port of the sirocco fan,
wherein air from the air exhaust port of the sirocco fan is divided into air passing through the electric power source and air passing through the polarization conversion element.

5. The projection type display unit according to claim 4, wherein the air intake port and the air exhaust port of the housing are provided on side surfaces of the housing.

* * * * *